United States Patent [19]

Toussaint

[11] 4,433,995
[45] Feb. 28, 1984

[54] GLASS MANUFACTURE

[75] Inventor: François Toussaint, Montignies-le-Tilleul, Belgium

[73] Assignee: Glaverbel, Brussels, Belgium

[21] Appl. No.: 351,731

[22] Filed: Feb. 23, 1982

[30] Foreign Application Priority Data

Feb. 25, 1981 [GB] United Kingdom ............... 8105929

[51] Int. Cl.$^3$ .................... C03B 5/027; C03B 5/02
[52] U.S. Cl. ........................................ 65/135; 65/134; 65/136; 373/41; 373/32
[58] Field of Search ................. 65/134, 135, 136, 347; 373/41, 33, 31, 32, 120

[56] References Cited

U.S. PATENT DOCUMENTS 3,108,149 10/1963 Carney et al. .................... 373/31
4,001,001 1/1977 Knavish et al. .................. 65/136 X
4,299,611 11/1981 Penberthy ........................ 65/134 X

OTHER PUBLICATIONS

G. W. Morey; The Properties of Glass; 1938; Reinhold Publishing Corp., 330 W. 42nd St., New York, N.Y., p. 365.

Plumat et al.; 49 Journal of the American Ceramic Society, 10, pp. 551-558, 10/1966.

Primary Examiner—Kenneth M. Schor
Attorney, Agent, or Firm—Spencer & Frank

[57] ABSTRACT

A continuous process of making glass, in which a vitrifiable batch is fed to a furnace equipped with heating devices for melting the batch so as to produce molten glass. The furnace has a melting end into which the batch is fed and a delivery end remote from the melting end and from which delivery end molten glass is withdrawn. The furnace presents a melting zone adjacent the melting end, in which the batch is melted. The melting zone is composed in the vertical direction of an upper half constituting a batch zone and of a lower half, and the melting zone is further composed in the horizontal direction of an upstream half proximate to the melting end and of a downstream half remote from the melting end. In order to promote melting of the vitrifiable batch, to thereby improve the quality of the glass produced, a direct electric current is established, during the process, between at least one cathode located in the upstream half of the batch zone and at least one anode located outside the batch zone.

19 Claims, 2 Drawing Figures

GLASS MANUFACTURE

BACKGROUND OF THE INVENTION

The present invention relates to a continuous process of making glass wherein batch is fed to a furnace equipped with heating means for melting the batch and with electrodes between which a direct electric current is established within the melt, to apparatus for performing the process, and to glass made using the process or the apparatus.

As is well known in the glass manufacturing art, a vitrifiable batch of the desired composition is introduced into the charging end of a tank furnace where it is melted in a melting zone and passes downstream in the tank through mixing and fining zones to a conditioning zone where the molten glass is allowed to cool to a desired working temperature. From the conditioning zone molten glass is passed to glass forming apparatus, for example a float tank or drawing machine or a bottle forming apparatus, where the glass is formed into a desired shape and allowed to cool. The expressions "upstream" and "downstream" are used herein to denote directions respectively towards the charging end and towards the conditioning zone of the tank.

It is well known that there is a region along the length of a melting tank where the atmosphere in contact with the glass is hottest. This is called the hot spot. From this point surface currents of glass must flow outwardly in all directions over a region which we call the spring zone. To maintain continuity there must be a current rising from the depths of the molten glass in the tank. This rising current can be considered as flowing from a particular point in the bath which we call the source. When no glass is being withdrawn from the tank and no batch is entering, the hot spot is at the center of the spring zone and is vertically above the source.

Diverging surface currents upstream of the spring zone travel towards the charging end wall where they tend to cool and form a falling convection current which returns along the bottom of the tank towards the source. Diverging downstream surface currents move along the tank, cool, and sink towards the bottom of the tank, and also return to the source.

Glass which flows into the conditioning zone comes largely from these downstream flowing surface currents, and, because it is hotter than the glass in the conditioning zone a further convection current circulation is set up there which causes a return flow of cooler glass from the conditioning zone along the bottom of the melting tank towards the source. This of course has an effect on the circulation of the glass in the regions of the source and spring zone. In fact the source may move slightly upstream so that its center is no longer coincident with the hot spot.

As the batch is delivered to the melting tank, it floats on the molten glass already in the tank in a layer which diminishes in thickness in the downstream direction. The downstream end portion of this layer of unmelted batch is generally covered with foam caused by the escape of gas bubbles as the batch constituents melt and react with each other and with the previously melted glass. This foam extends further downstream than the floating unmelted batch, but does not extend beyond a foam limit line because of the upstream-flowing surface currents of glass which diverge from the spring zone. This foam limit is of course upstream of the center of the spring zone. For the purposes of this specification, the spring zone is considered to be that area which is bounded at its upstream edge by the foam limit and has as its center that point on the surface of the bath from which surface currents diverge. Also the melting zone of the tank is defined for the purposes of this specification as the zone of the tank upstream of the center of the spring zone.

It is known to establish an electric current in the molten glass in a tank furnace for various purposes. One reason is to supply additional heat energy to the melt to raise its temperature. Another reason is to produce in the molten glass a stream of electrolytically formed oxygen bubbles so as to set up a particular desired pattern of flow currents in the molten glass in the tank to ensure that the melt is thoroughly mixed. If an anode producing such a stream of oxygen bubbles is located on the floor of the tank beneath the hot spot, the stream of oxygen bubbles may tend to stabilize the position of the source.

SUMMARY OF THE INVENTION

The present invention has as its principal object the establishment of an electric current in the molten glass in order to achieve a different purpose, namely to promote the rapid production of glass of an acceptably high quality in relation to the energy consumed. It is well known that certain constituents of the vitrifiable batch are more readily assimilable than other constituents. In particular, in the case of the most common glass batch compositions which comprise silica and alkali and/or alkaline earth metal oxides, the silica melts comparatively slowly, and the rate at which molten glass is drawn off from the tank must be kept low enough, or the heat energy supplied to the tank must be kept high enough that an acceptably low quantity of unmelted silica grains called "stones" are drawn off. The present invention is based on the discovery that it is possible to take certain steps to promote melting of the vitrifiable batch so that for a given energy input the rate of production be increased while still ensuring an acceptably low stone content of the glass drawn off.

According to the present invention, there is provided a continuous process of making glass wherein batch is fed to a furnace equipped with heating means for melting the batch and with electrodes between which a direct electric current is established within the melt, characterised in that there is a said electric current which is established between at least one cathode located in the upper half of the depth of the melt in the melting zone (which upper half of the melting zone is hereinafter called "the batch zone") and at least one anode located outside the batch zone. The direct current established in the melt may be continuous or pulsed for example as a rectified alternating current.

It has been found that by operating in accordance with the present invention, other operating conditions of the furnace being the same, it is possible to draw off glass having a lower stone population per unit mass. Alternatively, it is possible to produce glass of the same quality (i.e. of the same stone population per unit mass) at a greater rate for the same heat energy input.

The actual reason why this should be so is not at present clear, but one possible explanation is that the presence of the electric field created by the current promotes a breakdown in O=Si=O bonds and that this in turn promotes melting. But whether this is true or not, the fact remains that by operating in accordance with the invention, a more favorable relationship between the rate of glass production and the stone population of the glass produced is achieved.

It has been found that the main advantage of the present invention becomes more marked as the cathodes are located closer to the as yet unmelted batch, and it is accordingly preferred that the or at least one said cathode is located in the upper two thirds of the depth of the batch zone. For the same reason, it is preferred that the or at least one said cathode is located in the upstream half of the batch zone.

It will be recalled that surface currents in the molten glass upstream of the spring zone travel towards the charging end wall of the tank where they cool and form a falling convection current which returns along the bottom of the tank towards the source. These surface currents, travelling through the batch zone as they do tend to pick up unmelted or partly melted grains. It is accordingly preferred that at least one said cathode is located in the region of the charging end wall of the tank. Still further benefits are achieved when there is at least one additional cathode located in the region of the charging end wall of the tank and in the lower half of the depth of the melt. Alternatively, or in addition, and again so as to be effective against unmelted or partly melted grains entrained in such circulating currents in the melt, it is preferable to provide a further cathode or cathode group located in the region of the bottom of the tank in the upstream half of the melting zone.

Preferably, the or each said anode is located downstream of the or each said cathode. Such a spacing between the anode(s) and cathode(s) further promotes the advantages afforded by the present invention.

Alternatively, or in addition, it is preferable to locate the or each said anode at or near the bottom of the molten glass in the tank. This positioning of the anode(s) enables them better to resist forces due to the flow of currents in the molten glass. Furthermore, any oxygen bubbles formed at the anode(s) can thereby be caused to rise through substantially the full depth of the molten glass which is especially advantageous for decolorizing purposes. Constituents of the vitrifiable batch often contain sulfur (e.g. sulphide) and divalent iron as an impurity, and this tends to color the glass produced. Passing oxygen bubbles through the molten glass has the effect of oxidizing at least some of this sulfur and oxidizing at least some of this iron to a state in which they have a much lower coloring effect.

Preferably therefore, said current is established and the or at least one said anode is arranged to release streams of oxygen bubbles thereby to modify or control the specific internal visible light transmission of the glass produced.

It is especially preferred to locate the or at least one said anode substantially directly below the hot spot of the tank. This tends to fix the position of the source in the bath so that it is stabilized in its natural position, and even allows the source to be shifted to a new stable position if this is desired, partly because there may be some heating effect at the anode(s), but mainly because any oxygen bubbles formed will reduce the mean density of the melt in that region causing it to rise. Each of these effects tends to speed up the upward convection currents at the hot spot and this in turn localizes and stabilizes those currents.

An electrode for use in performing the invention may be made of any convenient material which will stand up to the conditions in the tank furnace. That is, it must withstand the heat and the chemical conditions and must be strong enough to stand up to glass currents flowing past it. It is also particularly desirable that the or each anode should be resistant to oxidation. Tin oxide is the presently most preferred anode material. Other preferred anode materials are chromium oxide, lanthanum oxide, lanthanum chromite and platinum. It is also desirable that the or each said cathode should be able to withstand reducing conditions. The presently preferred cathode materials are molybdenum, graphite, tungsten, molten tin.

The potential applied between the cathode(s) and the anode(s) is preferably at least 1 v and preferable 2.5 to 3 v or more.

The present invention also makes use, in some preferred embodiments, of the discovery that by modifying the constitution of the vitrifiable batch and by taking certain other steps it is possible to promote melting of the batch for the production of glass so that for a given heat input and glass output, the incidence of unmelted or undissolved grains of batch material in the glass produced will be reduced, so that the quality of the glass produced is improved. Conversely it is possible, for the same glass output and quality, to reduce the heat input.

In certain preferred embodiments of the invention, one or more reducing agents such as a sulphide or a finely divided metal is or are included in the vitrifiable batch introduced into the tank. These materials in general enlarge the sphere of influence of the cathodes on the molten glass and the batch so that melting of the batch is further promoted. Preferably furnace slag is included in the vitrifiable batch introduced into the tank.

The introduction into the vitrifiable batch of furnace slag has been found to promote melting of the batch. This is presently believed to be due to the presence in the slag of sulphides. Accordingly the quality of the glass produced in terms of the incidence of unmelted grains of batch material in the glass can be improved for a given heat energy input. Since furnace slag is very readily available and since it is also, in general, at least partially vitrified, this means that glass of a given quality can be made more economically. It will be appreciated however that furnace slag is also rich in iron, and it is well known that iron, especially in its divalent state, has a strong coloring effect on glass. For this reason it has hitherto been thought wrong deliberately to introduce slag into the vitrifiable batch, except perhaps in the manufacture of colored glass, e.g. for bottle manufacture where a dark, almost opaque glass is sometimes desirable. In the manufacture of clear glass, it has certainly been thought desirable to ensure that the glass contains as little iron as possible. In accordance with the invention, the coloring effect of the sulphur and the iron introduced into the vitrifiable batch is greatly reduced or obviated by the presence of free oxygen which has been electrolytically generated within the melt, so that clear glass can be produced if desired. The decolorizing effect of the oxygen is attributed to its oxidation of at least some of the sulphur and/or the iron in the glass to a higher valency state in which they have a much lower coloring effect on glass in which it is incorporated. The slag may of course be treated to reduce its iron content.

Said slag is preferably blast furnace slag in view of its wide availability.

Slags known in the trade under the names "Sexlal" and "Calumit" are especially suitable, and other slag compositions may be used.

The compositions of examples of suitable slags in parts by weight are given below.

|  | Slag I (Sexlal) | Slag II (Calumit) | Slag III |
|---|---|---|---|
| $SiO_2$ | 33.47 | 32.8 | 32.7 |
| $Al_2O_3$ | } 14.55 | { 12.0 | 11.82 |
| $TiO_2$ | | 2.5 | 0.78 |
| CaO | 43.70 | 42.8 | 37.64 |
| MgO | 4.35 | 6.2 | 10.46 |
| $Na_2O$ | } 1.63 | { 0.72 | 1.5 |
| $K_2O$ | | 0.75 | 1.5 |
| $Fe_2O_3$ | 0.51 | 0.14 | 0.266 |
| S | 0.7 | 0.77 | 1.15 |
| MnO | 0.6 | 0.72 | 0.51 |
| $P_2O_5$ | 0.6 | | 0.46 |

Said slag is preferably introduced into the batch in an amount between 20 and 150 kg, and optimally between 30 to 100 kg per ton of glass produced.

A process according to the invention may be used to produce colored or tinted glass, but it is preferable that the melt is decolorized to give a clear glass whose visible light transmission is at least 80% and whose purity of color excitation is preferably at most 0.4% when tested using CIE illuminant C.

Of course the light transmission of a vitreous body will depend inter alia on its thickness, and references to the visible light transmission of a glass here and elsewhere in this specification are references to the visible light transmission of, or calculated for, a sheet 5 mm in thickness having polished surfaces.

The present invention includes apparatus adapted for use in the performance of the process according to the invention and accordingly there is provided a glass melting tank furnace adapted to hold a predetermined depth of molten glass and provided with electrodes for establishing a direct electric current in the molten glass, characterized in that there is provided at least one cathode located in or projecting into a zone of the melting zone of the tank which zone (hereinafter called "the batch zone") is confined to the upper half of said predetermined depth, at least one anode located outside the batch zone, and means for establishing a current between said anode and said cathode.

This provides a very simple apparatus for performing the process of the invention, and an existing tank furnace can easily be modified by providing it with appropriately positioned electrodes.

Advantageously, said apparatus incorporates one or more of the following optional features: the or at least one said cathode is located in the upper two thirds of said batch zone; the or at least one said cathode is located in the upstream half of the batch zone; there is at least one said cathode located in the region of the charging end wall of the tank; there is at least one additional cathode located in the region of the charging end wall of the tank and in the lower half of said predetermined depth; there is a further cathode or cathode group located in the region of the bottom of the tank in the upstream half of the melting zone; the or each said anode is located at or near the bottom of the tank; there is at least one said anode located substantially directly below the hot spot of the tank; the or each said anode is made of tin oxide, chromium oxide, lanthanum oxide, lanthanum chromite or platinum; the or each said cathode is made of molybdenum, graphite, tungsten or molten tin. The advantages afforded by these optional features will readily be inferred from the advantages cited in respect of corresponding preferred features of the process of the invention.

BRIEF DESCRIPTION OF THE DRAWING

The invention will now be more particularly described by way of example only with reference to the accompanying drawings in which.

DESCRIPTION OF THE PREFERRED EMBODIMENTS

Figure 1:
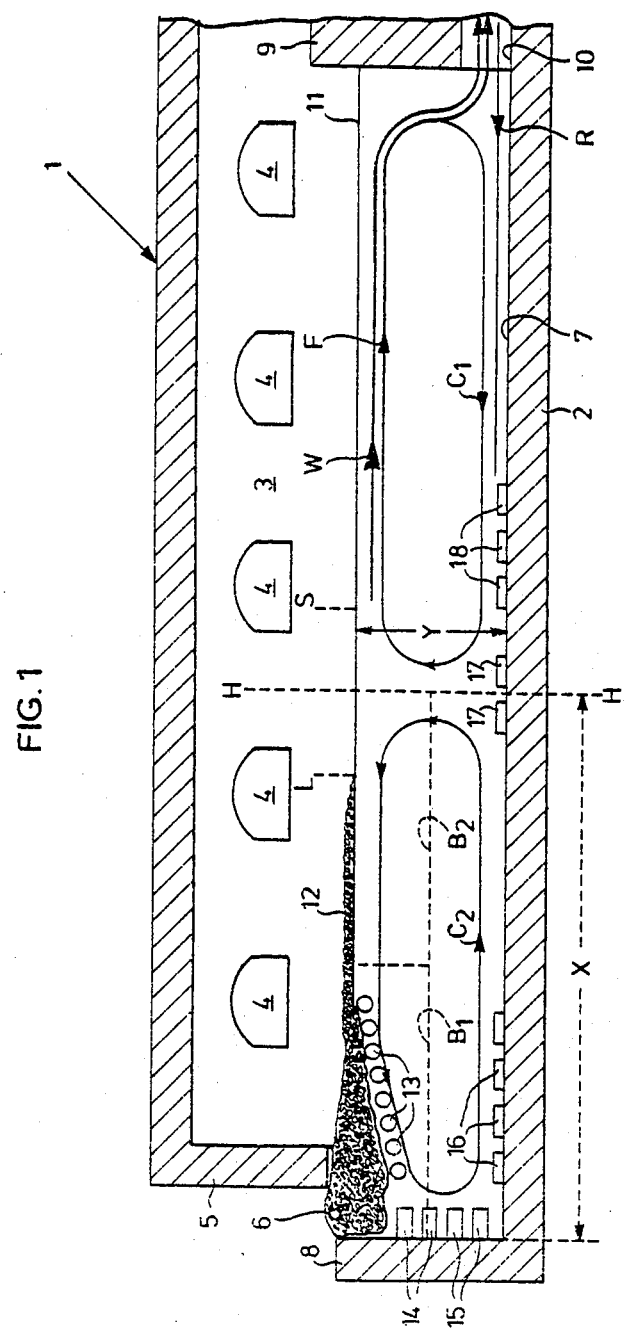
FIG. 1 is a diagrammatic cross-sectional view of a glass melting tank furnace.

In FIG. 1, a glass melting tank furnace generally indicated at 1 has a bottom 2, side walls 3 in which are formed a plurality of burner ports 4 and a gable wall or charging end wall 5. Vitrifiable batch 6 is fed to the melting tank 7 of the furnace through a dog-house 8 formed in the charging end wall 5. The downstream or delivery end of the melting tank 7 is defined by a bridge wall 9 in which is formed a throat 10 through which molten glass 11 contained in the melting tank 7 is passed to a conditioning zone (not shown) where the glass is brought to a temperature suitable for feeding it to whichever kind of glass forming machine is associated with the furnace. The melting tank 7 is constructed to hold a predetermined depth of molten glass Y.

A general scheme of the pattern of glass flow currents in the melt is indicated by various arrows. In the delivery end of the melting tank 7 to the right of FIG. 1, there is a surface withdrawal current W feeding through the throat 10 to the conditioning zone (not shown). Towards the bottom 2 of the tank there is a return current R of glass flowing back from the conditioning zone and joining a return flow portion of a circulating current system $C_1$ which flows towards the hottest part of the furnace approximately at its center, called the hot spot which is located on line H—H. At the hot spot, the circulating current system $C_1$ rises due to convection effects and moves as a forward current F in the downstream direction in upper portions of the melt in the tank.

Upstream of the circulating current system $C_1$, that is, to the left of the drawing, there is a second circulating current system $C_2$ formed by a hot rising current in the neighborhood of the hot spot and currents in the upper layers of the melt which flow in the upstream direction to the charging end wall 5 (and into the dog-house 8) where the molten glass in the current cools and sinks to return downstream in the lower layers of the melt towards the source (not shown) located beneath the hot spot.

As the batch 6 in the tank 7 melts, quantities of gas, mainly dioxides of carbon and sulphur and also water vapor, are liberated and these rise to the surface where they form a body of foam 12 lying over part of the as yet unmelted batch 6 and part of the melt 11. Because of the system of currents circulating in the melt, the foam 12 is confined to an upstream region of the surface of the melt, above a line known as the foam limit L. The length X of the melting tank upstream of the center of the spring zone is denoted in this specification by the expression "melting zone" of the tank.

A group of cathodes 13 is located in the melting zone X of the tank in the upper half of the depth of the melt, that is in the batch zone whose lower boundary is delimited by the line segments $B_1$, $B_2$. In fact this group of cathodes 13 is confined to the upstream half $B_1$ of the batch zone, this half extending upwardly from line segment $B_1$.

Two optional cathodes 14 project into the upstream half of the batch zone of the tank 7 in the region of the charging end wall 5, the lower one of cathodes 14 projecting only partly into the upstream half of the batch zone, and two further optional cathodes 15 project into the lower half of the depth of the molten glass 11 in the tank 7, also in the region of the charging end wall 5. In fact these cathodes 14, 15 are shown as projecting from the dog-house wall 8 as they would if the furnace was formed with a wide dog-house. Any cathodes 14, 15 which might project through the charging end wall 5 to either side of the dog-house are not shown.

A further group of optional cathodes 16 is shown projecting from the bottom 2 of the tank into the region of the melt beneath the upstream half of the batch zone.

A group of anodes 17 is located in the tank outside the batch zone. In fact two such anodes 17 are shown, and these are located on the bottom 2 of the tank below the spring zone L to S, that is, substantially directly beneath the hot spot.

An optional second group of anodes 18 is located on the bottom of the tank downstream of the first group of anodes 17.

The various electrodes are connected to a DC source (not shown) to apply a potential between them so that a current is established in the melt 11. This promotes melting or dissolution of the as yet unmelted batch in the molten glass.

Figure 2:
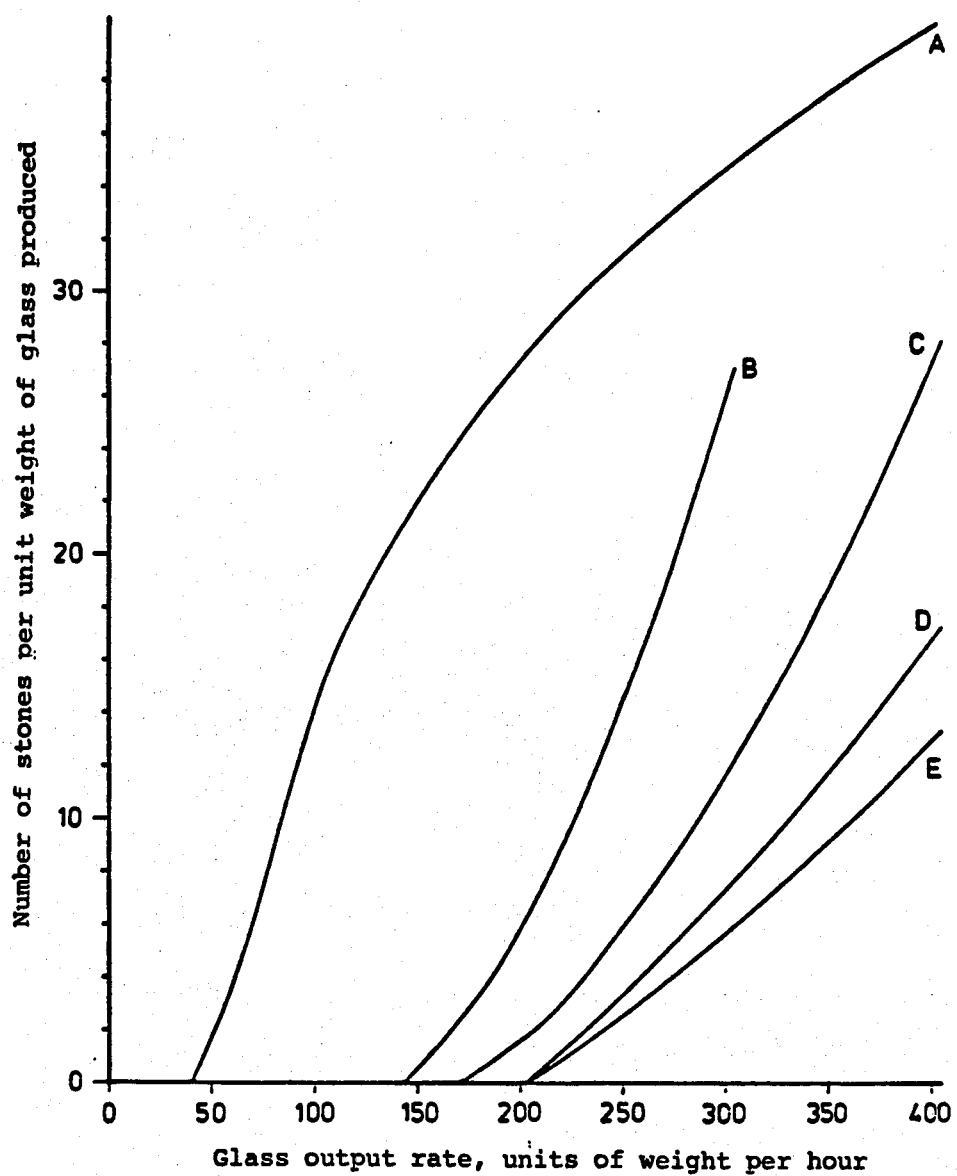
FIG. 2 is a graph relating glass production rate to stone population.

The benefits afforded by operating according to the present invention are illustrated in FIG. 2 which gives certain information derived from a pilot plant embodying the invention. In FIG. 2, the stone population, the number of stones counted per unit weight of glass produced is plotted on the vertical axis against glass output rates ranging up to 400 units of weight per hour. The tank furnace of the pilot plant was maintained at a temperature of 1300° C.

Curves A and B give stone population curves for glasses formed from two different batch compositions in the absence of any electric current flow in the melt. It will be appreciated that for ordinary glazing purposes, glass should have a negligible stone population, so that when the tank furnace is operated at 1300° C. glass production from batch composition A is limited to about 40 units of weight per hour and glass production from batch composition B is limited to about 140 units of weight per hour.

Curves C, D and E give stone population curves for glasses produced in accordance with the invention where a potential is maintained between an anode located beneath the hot spot and one or more cathodes located in the immediate vicinity of the as yet unmelted batch in the melting tank.

Curves C and D relate to the same batch composition as that from which curve A was derived. In curve C, a potential of 2.6 v was applied between the electrodes to establish a current of 0.5 A.kg$^{-1}$.h in the melt. By this means it was found that while still maintaining the tank furnace at 1300° C. glass having a negligible stone population could be produced at a rate of up to 170 units of weight per hour, more than fourfold increase in the production rate. Looked at another way, for a glass output of 170 units of weight per hour, the stone population can be reduced from about 24.5 per unit weight (curve A) to a negligible amount (curve C). In curve D, the potential applied between the electrodes was 2.75 V, the current again being 0.5 A.kg$^{-1}$.h. This enables a further increase, to 200 units of weight per hour, to be achieved in the rate of production of substantially stone-free glass.

Curve E relates to the batch composition from which curve B was derived, the operating conditions being as described with reference to curve C, that is 2.6 V and 0.5 A.kg$^{-1}$.h, and shows that here again, the production of substantially stone-free glass can be substantially increased, in this case from 140 to 200 units of weight per hour.

The optimum value of the current established between the electrodes and the potential maintained between those electrodes depend on a number of factors, in particular, the composition of the vitrifiable batch, and the desired quantity and quality of the output, and it is accordingly necessary to perform certain experiments. These may be carried out on a small scale pilot plant.

One first decides upon the composition of the glass to be produced, the required output rate of the manufacturing plant and the desired quality of the glass to be produced, that is, the number of unmelted grains which can be tolerated in a given weight of glass.

Electrodes of the type to be used in the manufacturing plant are manufactured or selected from stock. These electrodes may be of conventional form as is well known in the glass manufacturing art. It is preferable to use a molybdenum cathode and a tin oxide ($SnO_2$) anode. A reference electrode e.g. a zirconia sheathed platinum reference electrode is manufactured, and the reference electrode and the two other electrodes are immersed in a bath of molten glass of the composition which is to be manufactured. A graph is then plotted of the current density against potential in relation to the reference electrode which is taken to represent a fixed potential value. Details of a method for plotting this graph are to be found in Journal of the American Ceramic Society October 1966 Vol 49 No. 10 in an article at page 551 entitled "Formation of Bubbles by Electrochemical Processes in Glass."

The enhancement of melting of the vitrifiable batch appears to be mainly dependent on the cathode potential. The optimum potential of the cathodes is determined empirically in the pilot plant. For soda-lime glass, the optimum potential difference between the melt in the immediate vicinity of the cathodes and the bulk of the melt in the furnace lies in the range $-500$ mV to $-700$ mV. The maintenance of a higher negative potential difference is wasteful of energy in that it does not allow a commensurate increase in the glass production rate.

Next, one selects a desired total cathode area. This can be done so that any portion or the whole area of the as yet unmelted batch is in the immediate sphere of operation of at least one cathode. From this desired cathode area and the desired cathode potential relative to the fixed reference potential value and the current density/cathode potential curve which has been plotted, the total current can be derived. The anode area and spacing is then chosen to accommodate this total current.

Other benefits can be achieved by making a compromise, if such is necessary, between the current selected in dependence on the cathode area and the minimum current which produces sufficient oxygen to homogenize and perhaps decolorize the glass to a satisfactory extent for a given output rate from the melting tank. Clearly one major factor influencing this current level will be whether it is desired to produce bottle (i.e. green or amber) glass or clear glass. For practical purposes, the optimum decolorizing current required may be taken as being directly proportional to the glass output for a given furnace and electrode arrangement.

EXAMPLE 1

Soda-lime glass was produced in a tank furnace by melting a vitrifiable batch of the following composition (kg per ton of glass produced)

| | |
|---|---|
| sand | 690 |
| Dolomite | 226 |
| Limestone | 33 |
| Na$_2$CO$_3$ | 242 |
| Na$_2$SO$_4$ | 13 |
| Feldspar | 24 | to produce glass of the following composition (% by weight):

| | | |
|---|---|---|
| SiO$_2$ | 71.4 | |
| Na$_2$O | 14.1 | |
| CaO | 8.7 | |
| MgO | 4.8 | |
| Al$_2$O$_3$ | 0.9 | (+ 0.1 other oxides) |

The tank furnace was maintained at a temperature of 1520° C.

Molybdenum cathodes were inserted in holes in the walls of the tank furnace to project into the melt in the immediate vicinity of the as yet unmelted batch. The total cathode area exposed to the melt was 0.15 m$^2$.

Tin oxide anodes were located on the bottom of the melting tank and a potential difference of 4.5 volts was established between the electrodes so that an electric current of 8 amps was established in the melt.

Under these conditions glass having a negligible stone population could be drawn off at a rate of 1.25 tons/day.

When the electrodes were disconnected, glass drawn off at that rate had a stone population which was too high to count.

With the electrodes disconnected, glass having a negligible stone population could not be drawn off at a rate greater than 0.7 ton per day.

In modification of this example, the tin oxide anodes were located beneath the hot spot of the tank furnace, and their total area was chosen so that the current density at the anodes was sufficient to give rise to the formation of oxygen bubbles in an appropriate quantity to rise through the melt and homogenize the glass produced.

The batch composition given in this example was similar to that from which curves A, C and D on the accompanying FIG. 2 were derived.

EXAMPLE 2

A vitrifiable batch of the following composition (kg per ton of glass produced) was fed to a tank furnace maintained at 1520° C.:

| | |
|---|---|
| sand | 697 |
| Dolomite | 219 |
| Limestone | — |
| Na$_2$CO$_3$ | 221 |
| Na$_2$SO$_4$ | 13 |
| Slag | 46 |

The slag used was a blast furnace slag having the following composition (parts by weight)

| | |
|---|---|
| SiO$_2$ | 33.5 |
| Al$_2$O$_3$ | 15.3 |
| TiO$_2$ | 0.2 |
| CaO | 42.2 |
| MgO | 5.1 |
| K$_2$O | 0.5 |
| Fe$_2$O$_3$ | 0.4 |
| S | 1 |
| MnO | 0.68 |
| P$_2$O$_5$ | 0.6 |

The glass produced had the following composition (% by weight):

| | |
|---|---|
| SiO$_2$ | 71.4 |
| Na$_2$O + K$_2$O | 14.1 |
| CaO | 8.7 |
| MgO | 5 |
| Al$_2$O$_3$ | 0.9 |
| TiO$_2$ | 0.02 |
| Fe$_2$O$_3$ | 0.09 |
| MnO | 0.04 |
| P$_2$O$_5$ | 0.03 |

As with Example 1, molybdenum cathodes were introduced through the furnace walls to project into the melt in the immediate vicinity of the introduced batch. The total cathode area exposed to the melt was 0.02 m$^2$.

Tin oxide anodes were located on the bottom of the tank beneath the hot spot and downstream of that position. The total area of the anodes was 0.16 m$^2$.

With this anode arrangement, a current of 4 amps was established in the melt by applying a potential difference of 4 volts between the anodes and cathodes.

Under steady state conditions, with no current flowing in the melt, glass having a negligible stone population could be withdrawn at a rate of 0.25 ton per day. The clear glass produced had a specific internal visible light transmission (calculated for a sheet 5 mm in thickness) of 98.5%.

When a steady state had been reached with the current established, glass having a negligible stone population could be withdrawn at the increased rate of about 0.45 ton per day.

When glass was withdrawn at this increased rate with no current flowing (again under steady state conditions) the glass had a stone population too great to measure.

The batch composition given in this example corresponds to that from which curves B and E of FIG. 2 were derived.

EXAMPLE 3

A vitrifiable batch of the composition given in Example 1 was melted in a tank furnace having a melting capacity of 600 tons per day incorporating electrodes as described in FIG. 1. The anode/cathode potential difference was maintained at 10 V to allow a current of 6000 A to pass. The anode area was 30 m$^2$ and the cathode area 1.5 m$^2$. When a steady state had been reached, substantially stone-free glass could be drawn off at a rate between 120% and 150% of the rate under steady state conditions when no current flowed.

EXAMPLE 4

Glass was produced in a tank furnace substantially as illustrated in FIG. 1 by melting a vitrifiable batch of the following composition (kg/ton of glass produced):

| sand | 700.7 |
|---|---|
| Dolomite | 217.6 |
| Na$_2$CO$_3$ | 232.7 |
| Slag ("Sexlal") | 36 |

The tank furnace was maintained at a temperature of 1550° C.

In the absence of current flowing between the electrodes in the tank the glass produced had a specific internal visible light transmission of 55%, a color purity of excitation of about 71% when tested using CIE illuminant C and in color it was yellow having a dominant wavelength of 575 nm.

Substantially stone-free glass could be drawn off at a rate of 0.25 ton per day.

In accordance with the invention, an electrolyzing, oxygen generating current was caused to flow between anodes 17 and cathodes 14. Various parameters are indicated below

| Total anode area | 0.04 m$^2$ |
|---|---|
| Total cathode area | 0.02 m$^2$ |
| Cathode-anode potential difference | 4 volts |
| Total current | 2 amps |
| Anode current density | 50 amp/m$^2$ |

When steady state conditions had been reached, the following were observed in relation to the glass produced:

| Output rate | 0.25 ton per day |
|---|---|
| Specific internal visible light transmission | 73% |
| Purity of color excitation | 34% |
| Color | yellow dominant wavelength 573 nm |
| Calculated glass composition: | |
| SiO$_2$ | 71.4 |
| Na$_2$O | 14.1 |
| CaO | 8.7 |
| MgO | 5 |
| Al$_2$O$_3$ | 0.9 |
| Fe$_2$O$_3$ | 0.1 |

It was also found that stone-free glass could be produced at a rate 50% or more greater when said current was flowing.

EXAMPLE 5

A further batch composition was melted in a tank furnace under the electrolyzing current conditions specified in Example 1. The tank temperature was maintained at 1550° C.

The batch composition was as follows (Kg per ton of glass produced)

| sand | 700.7 |
|---|---|
| Dolomite | 217.6 |
| Na$_2$CO$_3$ | 228.5 |
| Na$_2$SO$_4$ | 16 |
| Slag (Sexlal) | 50.6 |

The Sexlal slag used had a Fe$_2$O$_3$ content of about 0.5%. The glass obtained was of a similar composition to that of Example 1 but it had an Fe$_2$O$_3$ content of 0.135%.

Glass produced under steady state conditions had the following properties:

| Specific internal visible light transmission | 87.8% |
|---|---|
| Purity of color excitation | 0.8% |
| Color dominant wavelength | 495 nm |

It was found that the rate at which substantially stone-free glass could be drawn off was increased by 50% or more when current flowed.

When a glass has been made in accordance with the invention it has been found that the fine structure of the glass, compared with that of a glass of similar composition, is modified, and this can be seen by microscopic examination. Furthermore, the redox state of multivalent elements within the glass structure, especially iron and sulphur, is altered and this can be determined electrochemically.

I claim:

1. A continuous process of making glass comprising: feeding a vitrifiable batch to a furnace equipped with heating means for melting the batch so as to produce molten glass, and with at least one cathode and at least one anode between which a direct electric current is established in the molten glass, the furnace having a melting end into which the batch is fed and having a delivery end remote from the melting end and from which delivery end molten glass is withdrawn, such that there is a net flow of molten glass in the direction which extends from the melting end to the delivery end, the furnace presenting a melting zone occupied by molten glass and coextensive in height with the molten glass, and in which zone the batch is melted, the melting zone being composed in the vertical direction of an upper half constituting a batch zone and of a lower half, and the melting zone further being composed in the horizontal direction of an upstream half proximate to the melting end and of a downstream half remote from the melting end; and establishing said electric current between at least one cathode located in the upstream half of the batch zone and at least one anode located outside the batch zone.

2. A process according to claim 1, wherein at least one said cathode is located in the upper two thirds of the depth of the batch zone.

3. A process according to claim 1 or 2, wherein the furnace has a charging end wall at the melting end and at least one said cathode is located in the region of the charging end wall.

4. A process according to claim 3, wherein there is at least one additional cathode located in the region of the charging end wall and in the lower half of the melting zone.

5. A process according to claim 1, wherein there is at least one further cathode located in the region of the bottom of the furnace in the upstream half of the melting zone.

6. A process according to claim 1, wherein the at least one anode is located closer to the delivery end than is the at least one cathode.

7. A process according to claim 1, wherein the at least one anode is located in the region of the bottom of the molten glass in the furnace.

8. A process according to claim 7, wherein said electric current is established, and the at least one said anode is arranged, for causing said anode to release streams of oxygen bubbles thereby to modify or control the specific internal visible light transmission of the glass produced.

9. A process according to claim 7 or 8, wherein said anode is located substantially directly below the hot spot created in the molten glass in the furnace.

10. A process according to claim 1, wherein said anode is made of tin oxide, chromium oxide, lanthanum oxide, lanthanum chromite or platinum.

11. A process according to claim 1, wherein the cathode is made of molybdenum, graphite, tungsten, or molten tin.

12. A process according to claim 1, wherein the potential applied between the cathode and the anode is at least 1 v.

13. A process according to claim 1, wherein at least one reducing agent is included in the vitrifiable batch fed into the furnace.

14. A process according to claim 1, wherein furnace slag is included in the vitrifiable batch fed into the furnace.

15. A process according to claim 14, wherein the slag is fed into the furnace in an amount between 20 and 150 kg/ton of glass produced.

16. A process according to claim 15, wherein the slag is fed into the furnace in an amount between 30 and 100 kg/ton of glass produced.

17. A process according to claim 12, wherein the potential applied between the cathode and the anode is at least 2.5 V.

18. A process according to claim 17, wherein the potential applied between the cathode and the anode is between 2.5 V and 3 V.

19. A process according to claim 13 wherein the reducing agent is a sulphide, a carbide or a finely divided metal.

* * * * *